(12) United States Patent
Savery et al.

(10) Patent No.: US 7,497,258 B2
(45) Date of Patent: *Mar. 3, 2009

(54) METHODS OF ISOLATING ZONES IN SUBTERRANEAN FORMATIONS USING SELF-DEGRADING CEMENT COMPOSITIONS

(75) Inventors: Mark R. Savery, Duncan, OK (US); Ashok K. Santra, Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/188,280

(22) Filed: Jul. 22, 2005

(65) Prior Publication Data

US 2006/0169454 A1   Aug. 3, 2006

Related U.S. Application Data

(63) Continuation-in-part of application No. 11/048,272, filed on Feb. 1, 2005, which is a continuation-in-part of application No. 11/048,591, filed on Feb. 1, 2005.

(51) Int. Cl.
*E21B 33/13* (2006.01)
(52) U.S. Cl. .................................. 166/292; 166/293
(58) Field of Classification Search ................ 166/292, 166/293
See application file for complete search history.

(56) References Cited

U.S. PATENT DOCUMENTS

| | | |
|---|---|---|
| 2,238,671 A | 4/1941 | Woodhouse ............... 166/21 |
| 2,288,557 A | 6/1942 | Vollmer |
| 2,703,316 A | 3/1955 | Schneider |
| 3,044,547 A | 7/1962 | Jarboe, Jr. |
| 3,173,484 A | 3/1965 | Huitt et al. |
| 3,195,635 A | 7/1965 | Fast |
| 3,272,650 A | 9/1966 | MacVittie |
| 3,302,719 A | 2/1967 | Fischer |
| 3,364,995 A | 1/1968 | Atkins et al. |

(Continued)

FOREIGN PATENT DOCUMENTS

EP   0 510 762 A1   3/1996

(Continued)

OTHER PUBLICATIONS

Foreign communication from a related counterpart application dated Sep. 25, 2006.

(Continued)

*Primary Examiner*—William P Neuder
(74) *Attorney, Agent, or Firm*—Craig W. Roddy; Baker Botts, LLP

(57) ABSTRACT

Methods of isolating particular zones within a subterranean formation utilizing self-degrading cement compositions are provided. An example of a method of the present invention is a method that includes: providing a self-degrading cement composition that includes a degradable material, an acid source, a base source, and a water source; placing the self-degrading cement composition in a zone within a subterranean formation; and allowing the self-degrading cement composition to set to form a solid mass that is capable of isolating the zone from a well bore penetrating the zone or from another zone.

20 Claims, 10 Drawing Sheets

U.S. PATENT DOCUMENTS

| | | |
|---|---|---|
| 3,366,178 A | 1/1968 | Malone et al. |
| 3,368,623 A | 2/1968 | Carter et al. |
| 3,448,800 A | 6/1969 | Parker et al. ................ 166/294 |
| 3,455,390 A | 7/1969 | Gallus |
| 3,784,585 A | 1/1974 | Schmitt et al. .............. 260/861 |
| 3,819,525 A | 6/1974 | Hattenbrun |
| 3,828,854 A | 8/1974 | Templeton et al. .......... 166/307 |
| 3,836,465 A | 9/1974 | Rhudy et al. |
| 3,862,663 A | 1/1975 | Curtice et al. |
| 3,868,998 A | 3/1975 | Lybarger et al. ............ 166/278 |
| 3,912,692 A | 10/1975 | Casey et al. |
| 3,948,672 A | 4/1976 | Harnsberger |
| 3,955,993 A | 5/1976 | Curtice et al. |
| 3,960,736 A | 6/1976 | Free et al. ................ 252/8.55 R |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,083,407 A | 4/1978 | Griffin, Jr. et al. .......... 166/291 |
| 4,169,798 A | 10/1979 | DeMartino ............. 252/8.55 R |
| 4,172,066 A | 10/1979 | Zweigle et al. |
| 4,210,455 A | 7/1980 | Metcalf et al. |
| 4,261,421 A | 4/1981 | Watanabe |
| 4,265,673 A | 5/1981 | Pace et al. |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway ................ 252/8.55 R |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. ..... 252/8.55 R |
| 4,632,876 A | 12/1986 | Laird et al. |
| 4,694,905 A | 9/1987 | Armbruster |
| 4,715,967 A | 12/1987 | Bellis et al. |
| 4,716,964 A | 1/1988 | Erbstoesser et al. ......... 166/284 |
| 4,767,706 A | 8/1988 | Levesque et al. |
| 4,772,346 A | 9/1988 | Anderson, Jr. et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. ......... 166/307 |
| 4,817,721 A | 4/1989 | Pober |
| 4,822,500 A | 4/1989 | Dobson, Jr. et al. |
| 4,829,100 A | 5/1989 | Murphey et al. |
| 4,836,940 A | 6/1989 | Alexander |
| 4,843,118 A | 6/1989 | Lai et al. ..................... 524/555 |
| 4,848,467 A | 7/1989 | Cantu et al. ................. 166/281 |
| 4,863,980 A | 9/1989 | Cowan et al. |
| 4,886,354 A | 12/1989 | Welch et al. |
| 4,894,231 A | 1/1990 | Moreau et al. |
| 4,957,165 A | 9/1990 | Cantu et al. |
| 4,961,466 A | 10/1990 | Himes et al. ................ 166/250 |
| 4,986,353 A | 1/1991 | Clark et al. ................. 166/279 |
| 4,986,354 A | 1/1991 | Cantu et al. ................. 166/279 |
| 4,986,355 A | 1/1991 | Cassad et al. |
| 5,034,139 A | 7/1991 | Reid et al. |
| 5,082,056 A | 1/1992 | Tackett, Jr. .................. 166/295 |
| 5,086,850 A | 2/1992 | Harris et al. |
| 5,142,023 A | 8/1992 | Gruber et al. ............... 528/354 |
| 5,151,203 A | 9/1992 | Riley et al. |
| 5,152,781 A | 10/1992 | Tang et al. |
| 5,161,615 A | 11/1992 | Hutchins et al. |
| 5,203,834 A | 4/1993 | Hutchins et al. |
| 5,213,446 A | 5/1993 | Dovan |
| 5,216,050 A | 6/1993 | Sinclair |
| 5,247,059 A | 9/1993 | Gruber et al. ............... 528/354 |
| 5,249,628 A | 10/1993 | Surjaatmadia |
| 5,251,697 A | 10/1993 | Shuler |
| 5,295,542 A | 3/1994 | Cole et al. |
| 5,298,069 A | 3/1994 | King et al. |
| 5,304,620 A | 4/1994 | Holtmyer et al. |
| 5,311,945 A | 5/1994 | Cowan et al. ............... 166/292 |
| 5,314,031 A | 5/1994 | Hale et al. ..................... 175/61 |
| 5,325,923 A | 7/1994 | Surjaatmadja et al. |
| 5,330,005 A | 7/1994 | Card et al. |
| 5,359,026 A | 10/1994 | Gruber ....................... 528/354 |
| 5,360,068 A | 11/1994 | Sprunt et al. |
| 5,363,916 A | 11/1994 | Himes et al. |
| 5,368,103 A | 11/1994 | Heathman et al. |
| 5,373,901 A | 12/1994 | Norman et al. |
| 5,386,874 A | 2/1995 | Laramay et al. |
| 5,396,957 A | 3/1995 | Surjaatmadja et al. |
| 5,402,846 A | 4/1995 | Jennings, Jr. et al. |
| 5,439,055 A | 8/1995 | Card et al. .................. 166/280 |
| 5,460,226 A | 10/1995 | Lawson et al. .............. 166/300 |
| 5,464,060 A | 11/1995 | Hale et al. |
| 5,475,080 A | 12/1995 | Gruber et al. ............... 528/354 |
| 5,484,881 A | 1/1996 | Gruber et al. ............... 528/354 |
| 5,487,897 A | 1/1996 | Polson et al. |
| 5,492,177 A | 2/1996 | Yeh et al. |
| 5,496,557 A | 3/1996 | Feijen et al. |
| 5,497,830 A | 3/1996 | Boles et al. |
| 5,499,678 A | 3/1996 | Surjaatmadja et al. |
| 5,501,276 A | 3/1996 | Weaver et al. |
| 5,505,787 A | 4/1996 | Yamaguchi |
| 5,512,071 A | 4/1996 | Yam et al. |
| 5,518,541 A | 5/1996 | Fogel et al. ................. 106/691 |
| 5,529,123 A | 6/1996 | Carpenter et al. |
| 5,536,807 A | 7/1996 | Gruber et al. ............... 528/354 |
| 5,555,936 A | 9/1996 | Pirri et al. |
| 5,566,757 A | 10/1996 | Carpenter et al. ........... 166/285 |
| 5,591,700 A | 1/1997 | Harris et al. ................. 507/204 |
| 5,594,095 A | 1/1997 | Gruber et al. ............... 528/354 |
| 5,602,083 A | 2/1997 | Gabrysch et al. |
| 5,604,186 A | 2/1997 | Hunt et al. .................. 507/204 |
| 5,607,905 A | 3/1997 | Dobson, Jr. et al. |
| 5,613,558 A | 3/1997 | Dillenbeck |
| 5,670,473 A | 9/1997 | Scepanski |
| 5,697,440 A | 12/1997 | Weaver et al. |
| 5,698,322 A | 12/1997 | Tsai et al. |
| 5,723,416 A | 3/1998 | Liao |
| 5,765,642 A | 6/1998 | Surjaatmadja |
| 5,783,527 A | 7/1998 | Dobson, Jr. et al. |
| 5,791,415 A | 8/1998 | Nguyen et al. |
| 5,799,734 A | 9/1998 | Normal et al. |
| 5,833,000 A | 11/1998 | Weaver et al. |
| 5,849,401 A | 12/1998 | El-Afandi et al. ........... 428/215 |
| 5,853,048 A | 12/1998 | Weaver et al. |
| 5,893,416 A | 4/1999 | Read |
| 5,908,073 A | 6/1999 | Nguyen et al. |
| 5,916,849 A | 6/1999 | House |
| 5,924,488 A | 7/1999 | Nguyen et al. |
| 5,964,291 A | 10/1999 | Bourne et al. |
| 5,977,030 A | 11/1999 | House |
| 5,979,557 A | 11/1999 | Card et al. |
| 5,996,693 A | 12/1999 | Heathman |
| 6,004,400 A | 12/1999 | Bishop et al. |
| 6,024,170 A | 2/2000 | McCabe et al. |
| 6,026,903 A | 2/2000 | Shy et al. |
| 6,028,113 A | 2/2000 | Scepanski |
| 6,047,772 A | 4/2000 | Weaver et al. |
| 6,073,694 A | 6/2000 | Crawshaw |
| 6,110,875 A | 8/2000 | Tjon-Joe-Pin et al. |
| 6,114,410 A | 9/2000 | Betzold |
| 6,123,159 A | 9/2000 | Brookey et al. |
| 6,123,965 A | 9/2000 | Jacob et al. |
| 6,131,661 A | 10/2000 | Conner et al. |
| 6,135,987 A | 10/2000 | Tsai et al. |
| 6,143,698 A | 11/2000 | Murphey et al. |
| 6,148,917 A | 11/2000 | Brookey et al. |

| | | | | | | |
|---|---|---|---|---|---|---|
| 6,162,766 A | 12/2000 | Muir et al. ............... 507/267 | | 6,981,552 B2 | 1/2006 | Reddy et al. |
| 6,169,058 B1 | 1/2001 | Le et al. | | 6,983,801 B2 | 1/2006 | Dawson et al. |
| 6,172,011 B1 | 1/2001 | Card et al. | | 6,987,083 B2 | 1/2006 | Phillippi et al. |
| 6,189,615 B1 | 2/2001 | Sydansk ..................... 166/270 | | 6,997,259 B2 | 2/2006 | Nguyen |
| 6,202,751 B1 | 3/2001 | Chatterji et al. | | 7,000,701 B2 | 2/2006 | Todd et al. |
| 6,204,214 B1 | 3/2001 | Singh et al. ................. 501/155 | | 7,007,752 B2 | 3/2006 | Reddy et al. |
| 6,209,643 B1 | 4/2001 | Nguyen et al. | | 7,021,377 B2 | 4/2006 | Todd et al. |
| 6,209,646 B1 | 4/2001 | Reddy et al. | | 7,032,663 B2 | 4/2006 | Nguyen |
| 6,214,773 B1 | 4/2001 | Harris et al. | | 7,036,586 B2 | 5/2006 | Roddy et al. |
| 6,242,390 B1 | 6/2001 | Mitchell et al. ............ 507/211 | | 7,036,587 B2 | 5/2006 | Munoz, Jr. et al. |
| 6,258,160 B1 | 7/2001 | Chatterji et al. | | 7,044,220 B2 | 5/2006 | Nguyen et al. |
| 6,260,622 B1 | 7/2001 | Blok et al. | | 7,044,224 B2 | 5/2006 | Nguyen |
| 6,291,013 B1 | 9/2001 | Gibson et al. | | 7,049,272 B2 | 5/2006 | Sinclair et al. |
| 6,300,286 B1 | 10/2001 | Dobson, Jr. et al. | | 7,063,151 B2 | 6/2006 | Nguyen et al. |
| 6,302,209 B1 | 10/2001 | Thompson, Sr. et al. | | 7,066,258 B2 | 6/2006 | Justus et al. |
| 6,308,788 B1 | 10/2001 | Patel et al. | | 7,066,260 B2 | 6/2006 | Sullivan et al. |
| 6,311,773 B1 | 11/2001 | Todd et al. | | 7,069,994 B2 | 7/2006 | Cooke, Jr. |
| 6,323,307 B1 | 11/2001 | Bigg et al. | | 7,080,688 B2 | 7/2006 | Todd et al. |
| 6,326,458 B1 | 12/2001 | Gruber et al. ............... 528/354 | | 7,093,664 B2 | 8/2006 | Todd et al. |
| 6,328,105 B1 | 12/2001 | Betzold | | 7,096,947 B2 | 8/2006 | Todd et al. ............... 166/283 |
| 6,330,917 B2 | 12/2001 | Chatterji et al. | | 7,101,829 B2 | 9/2006 | Guichard et al. |
| 6,357,527 B1 | 3/2002 | Norman et al. | | 7,131,491 B2 | 11/2006 | Blauch et al. |
| 6,364,945 B1 | 4/2002 | Chatterji et al. | | 7,132,389 B2 | 11/2006 | Lee |
| 6,380,138 B1 | 4/2002 | Ischy et al. | | 7,140,438 B2 | 11/2006 | Frost et al. |
| 6,387,986 B1 | 5/2002 | Moradi-Araghi et al. .... 523/211 | | 7,147,067 B2 | 12/2006 | Getzlaf et al. |
| 6,390,195 B1 | 5/2002 | Nguyen et al. | | 7,151,077 B2 | 12/2006 | Prud'homme et al. |
| 6,394,185 B1 | 5/2002 | Constien | | 7,153,902 B2 | 12/2006 | Altes et al. |
| 6,422,314 B1 | 7/2002 | Todd et al. ............... 166/312 | | 7,156,174 B2 | 1/2007 | Roddy et al. |
| 6,422,326 B1 | 7/2002 | Brookey et al. | | 7,165,617 B2 | 1/2007 | Lord et al. |
| 6,432,155 B1 | 8/2002 | Swazey et al. | | 7,166,560 B2 | 1/2007 | Still et al. |
| 6,454,003 B1 | 9/2002 | Chang et al. | | 7,168,489 B2 | 1/2007 | Frost et al. |
| 6,485,947 B1 | 11/2002 | Rajgarhia et al. | | 7,172,022 B2 * | 2/2007 | Reddy et al. ................. 166/293 |
| 6,488,763 B2 | 12/2002 | Brothers et al. | | 7,178,596 B2 | 2/2007 | Blauch et al. |
| 6,494,263 B2 | 12/2002 | Todd ......................... 166/312 | | 7,195,068 B2 | 3/2007 | Todd |
| 6,508,305 B1 | 1/2003 | Brannon et al. ............. 166/293 | | 7,204,312 B2 | 4/2007 | Roddy et al. |
| 6,509,301 B1 | 1/2003 | Vollmer | | 7,205,264 B2 | 4/2007 | Boles |
| 6,527,051 B1 | 3/2003 | Reddy et al. | | 7,216,705 B2 | 5/2007 | Saini et al. |
| 6,554,071 B1 | 4/2003 | Reddy et al. | | 7,219,731 B2 | 5/2007 | Sullivan et al. |
| 6,566,310 B2 | 5/2003 | Chan | | 7,228,904 B2 | 6/2007 | Todd et al. |
| 6,569,814 B1 | 5/2003 | Brady et al. | | 7,261,156 B2 | 8/2007 | Nguyen et al. |
| 6,578,630 B2 | 6/2003 | Simpson et al. | | 7,264,051 B2 | 9/2007 | Nguyen et al. |
| 6,592,660 B2 | 7/2003 | Nguyen et al. | | 7,265,079 B2 | 9/2007 | Wilbert et al. |
| 6,599,863 B1 | 7/2003 | Palmer et al. ............... 507/219 | | 7,267,170 B2 | 9/2007 | Mang et al. |
| 6,667,279 B1 | 12/2003 | Hessert et al. | | 7,276,466 B2 | 10/2007 | Todd et al. |
| 6,669,771 B2 | 12/2003 | Tokiwa et al. ............... 106/162 | | 7,299,869 B2 | 11/2007 | Kalman |
| 6,681,856 B1 | 1/2004 | Chatterji et al. | | 7,303,014 B2 | 12/2007 | Reddy et al. |
| 6,686,328 B1 | 2/2004 | Binder | | 7,306,037 B2 | 12/2007 | Nguyen et al. |
| 6,691,780 B2 | 2/2004 | Nguyen et al. | | 7,322,412 B2 | 1/2008 | Badalamenti et al. |
| 6,702,023 B1 | 3/2004 | Harris et al. | | 7,353,876 B2 | 4/2008 | Savery et al. |
| 6,710,019 B1 | 3/2004 | Sawdon et al. ............... 507/136 | | 2001/0016562 A1 | 8/2001 | Muir et al. ................. 507/201 |
| 6,716,797 B2 | 4/2004 | Brookey | | 2001/0032022 A1 | 10/2001 | Ricci et al. |
| 6,737,385 B2 | 5/2004 | Todd et al. | | 2002/0036088 A1 | 3/2002 | Todd |
| 6,761,218 B2 | 7/2004 | Nguyen et al. | | 2002/0119169 A1 | 8/2002 | Angel et al. |
| 6,763,888 B1 | 7/2004 | Harris et al. | | 2002/0125012 A1 | 9/2002 | Dawson et al. |
| 6,764,981 B1 | 7/2004 | Eoff et al. | | 2003/0054962 A1 | 3/2003 | England et al. |
| 6,793,018 B2 | 9/2004 | Dawson et al. | | 2003/0060374 A1 | 3/2003 | Cooke, Jr. ................... 507/200 |
| 6,793,730 B2 | 9/2004 | Reddy et al. | | 2003/0114314 A1 | 6/2003 | Ballard et al. ............... 507/100 |
| 6,806,235 B1 | 10/2004 | Mueller et al. | | 2003/0130133 A1 | 7/2003 | Vollmer ...................... 507/100 |
| 6,817,414 B2 | 11/2004 | Lee | | 2003/0147965 A1 | 8/2003 | Basset et al. |
| 6,818,594 B1 | 11/2004 | Freeman et al. | | 2003/0230407 A1 | 12/2003 | Vijn et al. |
| 6,837,309 B2 | 1/2005 | Boney et al. | | 2003/0234103 A1 | 12/2003 | Lee et al. .................... 166/293 |
| 6,840,318 B2 | 1/2005 | Lee et al. | | 2004/0014606 A1 | 1/2004 | Parlar et al. |
| 6,852,173 B2 | 2/2005 | Banerjee et al. | | 2004/0014607 A1 | 1/2004 | Sinclair et al. ............... 507/200 |
| 6,861,394 B2 | 3/2005 | Ballard et al. | | 2004/0040706 A1 | 3/2004 | Hossaini et al. ............. 166/278 |
| 6,883,608 B2 | 4/2005 | Parlar et al. | | 2004/0055747 A1 | 3/2004 | Lee .............................. 166/278 |
| 6,886,635 B2 | 5/2005 | Hossaini et al. | | 2004/0070093 A1 | 4/2004 | Mathiowitz et al. |
| 6,896,058 B2 | 5/2005 | Munoz, Jr. et al. | | 2004/0094300 A1 | 5/2004 | Sullivan et al. |
| 6,904,971 B2 | 6/2005 | Brothers et al. | | 2004/0106525 A1 | 6/2004 | Willberg et al. ............. 507/200 |
| 6,908,506 B2 | 6/2005 | Zimmermann | | 2004/0138068 A1 | 7/2004 | Rimmer et al. |
| 6,949,491 B2 | 9/2005 | Cooke, Jr. | | 2004/0152601 A1 | 8/2004 | Still et al. ................... 507/100 |
| 6,959,767 B2 | 11/2005 | Horton et al. | | 2004/0152602 A1 | 8/2004 | Boles .......................... 507/100 |
| 6,968,898 B2 | 11/2005 | Todd et al. | | 2004/0170836 A1 | 9/2004 | Bond et al. |
| 6,978,838 B2 | 12/2005 | Parlar et al. | | 2004/0231845 A1 | 11/2004 | Cooke, Jr. ................... 166/279 |

| | | | |
|---|---|---|---|
| 2004/0261993 | A1 | 12/2004 | Nguyen et al. |
| 2004/0261996 | A1 | 12/2004 | Munoz, Jr. et al. |
| 2005/0028976 | A1 | 2/2005 | Nguyen |
| 2005/0034861 | A1 | 2/2005 | Saini et al. |
| 2005/0059556 | A1 | 3/2005 | Munoz, Jr. et al. |
| 2005/0059557 | A1 | 3/2005 | Todd et al. |
| 2005/0059558 | A1 | 3/2005 | Todd et al. |
| 2005/0126785 | A1 | 6/2005 | Todd et al. |
| 2005/0130848 | A1 | 6/2005 | Todd et al. |
| 2005/0167104 | A1 | 8/2005 | Roddy et al. |
| 2005/0183741 | A1 | 8/2005 | Surjaatmadja et al. |
| 2005/0205258 | A1* | 9/2005 | Reddy et al. ............... 166/292 |
| 2005/0205266 | A1 | 9/2005 | Todd et al. |
| 2005/0252659 | A1 | 11/2005 | Sullivan et al. |
| 2005/0272613 | A1 | 12/2005 | Cooke, Jr. |
| 2005/0277554 | A1 | 12/2005 | Blauch et al. |
| 2006/0016596 | A1 | 1/2006 | Pauls et al. |
| 2006/0032633 | A1 | 2/2006 | Nguyen |
| 2006/0042798 | A1* | 3/2006 | Badalamenti et al. ....... 166/285 |
| 2006/0046938 | A1 | 3/2006 | Harris et al. |
| 2006/0065397 | A1 | 3/2006 | Nguyen et al. |
| 2006/0086503 | A1* | 4/2006 | Reddy et al. ............... 166/293 |
| 2006/0105917 | A1 | 5/2006 | Munoz, Jr. |
| 2006/0105918 | A1 | 5/2006 | Munoz, Jr. et al. |
| 2006/0108150 | A1 | 5/2006 | Luke et al. |
| 2006/0169182 | A1 | 8/2006 | Todd et al. |
| 2006/0169448 | A1 | 8/2006 | Savery et al. |
| 2006/0169449 | A1* | 8/2006 | Mang et al. ................ 166/278 |
| 2006/0169450 | A1 | 8/2006 | Mang et al. |
| 2006/0172891 | A1 | 8/2006 | Todd et al. |
| 2006/0172894 | A1 | 8/2006 | Mang et al. |
| 2006/0172895 | A1 | 8/2006 | Mang et al. |
| 2006/0185848 | A1 | 8/2006 | Surjaatmadja et al. |
| 2006/0258543 | A1 | 11/2006 | Saini |
| 2006/0258544 | A1 | 11/2006 | Saini |
| 2006/0276345 | A1 | 12/2006 | Todd et al. |
| 2007/0100029 | A1* | 5/2007 | Reddy et al. ................... 524/5 |
| 2007/0298977 | A1 | 12/2007 | Mang et al. |
| 2008/0009423 | A1 | 1/2008 | Mang et al. |

FOREIGN PATENT DOCUMENTS

| | | |
|---|---|---|
| EP | 0 879 935 | 11/1998 |
| EP | 1 413 710 | 4/2004 |
| GB | 2 412 389 | 3/2004 |
| JP | 2004181820 | 12/2002 |
| WO | WO 9315127 | 8/1993 |
| WO | WO 9407949 | 4/1994 |
| WO | WO 9408078 | 4/1994 |
| WO | WO 9408090 | 4/1994 |
| WO | WO 9509879 | 4/1995 |
| WO | WO 9711845 | 4/1997 |
| WO | WO 99/27229 | 6/1999 |
| WO | WO 00/57022 | 9/2000 |
| WO | WO 01/02698 A1 | 1/2001 |
| WO | WO 01/87797 A1 | 11/2001 |
| WO | WO 01/94744 | 12/2001 |
| WO | WO 02/12674 A1 | 2/2002 |
| WO | WO 03/027431 A3 | 4/2003 |
| WO | WO 2004/007905 A1 | 1/2004 |
| WO | WO 2004/037946 A1 | 5/2004 |
| WO | WO 2004/038176 A1 | 5/2004 |
| WO | WO 2005/000993 | 1/2005 |
| WO | WO 2007/010237 | 1/2007 |
| WO | WO 2007/010239 | 1/2007 |

OTHER PUBLICATIONS

Halliburton brochure entitled "Pozmix® A Cement Additive" dated 1999.
Halliburton brochure entitled "Silicalite Cement Additive" dated 1999.
Halliburton brochure entitled "VersaSet™ Cementing System" dated 1996.
Halliburton brochure entitled "VeraSet Thixotropic Additive" dated 1999.
Advances in Polymer Science, "Degradable Aliphatic Polyesters", vol. 157/2001, pp. 1-138.
BioMacromolecules, "Poly(ortho esters)-From Concept to Reality" Sep./Oct. 2004, vol. 5, No. 5.
Schwach-Abdellaoui, K. et al., "Hydrolysis and Erosion Studies of Autocatalyzed Poly(ortho esters) Containing Lactoyl-Lactyl Acid Dimers" dated 1999.
NG, S.Y. et al., "Synthesis and Erosion Studies of Self-Catalyzed Poly (ortho ester)s" dated 1996.
NG, S.Y. et al., "Development of a poly(ortho ester) prototype with a latent acid in the polymer backbone for 5-flourouracil delivery" dated 1999.
Rothen-Weinhold, A et al., "Release of BSA from poly(ortho ester) extruded thin strands" dated 2000.
Heller, et al., Poly(ortho ester)s—their development and some recent applications, European Journal of Pharmaceutics and Biopharmaceutics, 50, 2000, (pp. 121-128).
Heller, et al., Poly(ortho esters); synthesis, characterization, properties and uses, Advanced Drug Delivery Reviews, 54, 2002, (pp. 1015-1039).
Heller, et al., Poly(ortho esters) For The Pulsed And Continuous Delivery of Peptides And Proteins, Controlled Release and Biomedical Polymers Department, SRI International.
Zignani, et al., Subconjunctival biocompatibility of a viscous bioerodable poly(ortho ester), J. Biomed Mater Res, 39, 1998, pp. 277-285.
Toncheva, V. et al., "Use of Block copolymers of Poly(Ortho Esters) and Poly (Ethylene Glycol) Micellar Carriers as Potential Tumour Targeting Systems" dated 2003.
Schwach-Abdellaoui, K. et al., "Control of Molecular Weight for Auto-Catalyzed Poly(ortho ester) Obtained by Polycondensation Reaction" dated 2002.
Heller, J. et al., "Release of Norethindrone from Poly(Ortho Esters)*" dated 1981.
Cordes, E.H. et al., "Mechanism and Catalysis for Hydrolysis of Acetals, Ketais, and Ortho Esters" dated 1973.
Todd, Brad et al., "A Chemical "Trigger" Useful for Oilfield Applications" SPE 9279, dated 2005.
Skrabel, Anton, et al., "The hydrolysis rate of orthoformic acid ethyl ether" dated 1921.
U.S. Appl. No. 10/802,340, filed Mar. 17, 2004, Reddy et al.
U.S. Appl. No. 10/608,319, filed Jun. 27, 2003.
U.S. Appl. No. 10/608,373, filed Jun. 27, 2003.
Foreign communication from a related counterpart application, Oct. 4, 2006.
Office Action from Application No. 11/188,238, Jun. 8, 2007.
Office Action from Application No. 11/188,262, Jun. 5, 2007.
Simmons, et al., "Poly(phenyllactide): Synthesis, Characterization, and Hydrolytic Degradation," Biomacromolecules, vol. 2, No. 3 (pp. 658-663), 2001.
Yin, et al., "Preparation and Characterization of Substituted Polylactides," Am. Chem. Soc., vol. 32, No. 23 (pp. 7711-7718), 1999.
Yin, et al., "Synthesis and Properties of Polymers Derived form Substituted Lactic Acids," Am. Chem. Soc., Ch. 12 (pp. 147-159), 2001.
Dechy-Cabaret, et al., "Controlled Ring-Opening Polymerization of Lactide and Glycolide," American Chemical Society, Chemical Reviews, 2004.
Virun, Vichaibun and Montri Chulavatnatol, "A New Assay for the Enzymatic Degradation of Polylactic Acid" ScienceAsia 29: 297-300 (Copy enclosed in Jul. 22, 2005 mailing), 2003.
Ceratech Inc., "PaveMend" (Copy enclosed in Jul. 22, 2005 mailing), undated.
"Technology Transfer at Argonne; Commercialization and Licensing Opportunity; Chemically Bonded Ceramic," available at http://www.techtransfer.anl.gov/techtour/ceramicrete.html (Copy enclosed in Jul. 22, 2005 mailing), Dec. 27, 2004.
Argonne National Laboratory, "Ceramicrete Provides Concrete Evidence of Superior Performance" (Copy enclosed in Jul. 22, 2005 mailing), undated.

Civil Engineering Research Foundation, "New Materials and Technologies Available for Use in Industrial Infrastructure," 6, 2003.

Mark Anderson and Mike Riley, "PaveMend™ as a Solution for Rapid Runway Repair" (Copy enclosed in Jul. 22, 2005 mailing), undated.

S.Y. Jeong and A. S. Wagh, "Chemically Bonded Phosphate Ceramics: Cementing the Gap Between Ceramics and Cements" (Copy enclosed in Jul. 22, 2005 mailing), Jun. 2002.

Alan D. Wilson and John W. Nicholson (Cambridge Univ. Press 1993), "Acid-Base Cements: Their Biomedical and Industrial Applications", 1993.

Office Action from U.S. Appl. No. 11/188,262.

Office Action from U.S. Appl. No. 11/188,238.

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Funkhouser, et al, *Synthetic Polymer Fracturing Fluid for High-Temperature Applications*, SPE 80236, Scoiety of Petroleum Engineers, 2003.

Halliburton, *SurgiFrac[SM] Service, A Quick and Cost-Effective Method to Help Boost Production From Openhole Horizontal Completions, Halliburton Communications*, HO3297, 2002.

Halliburton, *Cobra Frac[SM] Service, Coiled Tubing Fracturing-Cost-Effective Method for Stimulating Untapped Reserves*, HO2319R, Halliburton Energy Services, 2000.

Kiyoshi Matsuyama et al, Environmentally benign formation of polymeric microshperes by rapid expansion of supercritical carbon dioxide solution with a nonsolvent, Environ Sci Techno12001, 35, 4149-4155.

Office action dated Jul. 24, 2007 from U.S. Appl. No. 11/048,272.

Office action dated Jan. 31, 2007 from U.S. Appl. No. 11/048,272.

Office action dated Jan. 15, 2008 from U.S. Appl. No. 11/188,238.

Office action dated Jan. 15, 2008 from U.S. Appl. No. 11/188,262.

Office Action dated Apr. 23, 2008 from U.S. Appl. No. 11/048,591.

Office Action mailed Oct. 23, 2008, for U.S. Appl. No. 11/048,591.

Office Action mailed Jul. 2, 2008, from Appl. No. 11/188,238.

Office Action mailed Jul. 2, 2008, from U.S. Appl. No. 11/188,262.

Chelating Agents, Encyclopedia of Chemical Technology, vol. 5 (764-795), 1995.

Halliburton, CobraJet FracSM Service, Cost-effective Technology That Can Help Reduce Cost Per BOE Produced, Shorten Cycle Time and Reduce Capex, Halliburton Communications, 2006.

Y. Chiang et al., Hydrolysis of Ortho Esters; Further Investigation of The Factors Which Control The Rate-Determining Step, Engineering Information, Inc. NY, NY, vol. 105, No. 23 (XP-0023228842), 1983.

M. Ahmad, et al., Ortho Ester Hydrolysis: Direct Evidence For A Three-Stage Reaction Mechanism, Engineering Information, Inc. NY, NY, vol. 101, No. 10 (XP-002322843), 1979.

\* cited by examiner

METHODS OF ISOLATING ZONES IN SUBTERRANEAN FORMATIONS USING SELF-DEGRADING CEMENT COMPOSITIONS

CROSS-REFERENCE TO RELATED APPLICATIONS

This application is a continuation-in-part of U.S. patent application Ser. Nos. 11/048,272 and 11/048,591, both entitled "Self-Degrading Cement Compositions and Methods of Using Self-Degrading Cement Compositions in Subterranean Formations," both filed on Feb. 1, 2005, the entirety of which are herein incorporated by reference, and from which priority is claimed pursuant to 35 U.S.C. § 120.

This application is also related to U.S. patent application Ser. No. 11/188,238, entitled "Methods of Directional Drilling and Forming Kickoff Plugs using Self-Degrading Cement in Subterranean Well Bores," and U.S. patent application Ser. No. 11/188,262, entitled "Kickoff Plugs Comprising a Self-Degrading Cement in Subterranean Well Bores," both filed on the same day herewith, the entirety of both of which is herein incorporated by reference.

BACKGROUND

The present invention relates to subterranean well construction. More particularly, the present invention relates to methods of isolating particular zones within a subterranean formation utilizing self-degrading cement compositions.

Wells for producing fluids found in subterranean formations may extend several thousand meters below the surface of the earth, and may penetrate several different zones of a subterranean formation. As referred to herein, the term "zone" is defined to mean an interval or unit of rock that is differentiated from surrounding rock on the basis of at least one factor such as, but not limited to, the particular interval's fossil content, fluid content, bulk density, permeability, porosity, compressive strength, tensile strength, shear strength, crystalline structure, or other features, such as faults or fractures. Often, a particular unit of rock may be differentiated from surrounding rock by engineering parameters (e.g., Poisson's Ratio, Shear Modulus, Bulk Modulus, and Young's Modulus) that may be unique to the particular unit of rock. In addition to zones comprising hydrocarbons (e.g., oil and gas), production wells frequently encounter brine and fresh water zones, as well as zones containing undesirable supercritical fluids or gases (e.g., carbon dioxide and hydrogen sulfide). Production wells also may encounter zones containing shales, which may hinder the effectiveness of various subterranean operations, in view of shale's tendency, upon intermingling with some aqueous fluids, to swell and at least partially degrade into clay particles.

To enhance the efficiency of hydrocarbon production from a well, the producing zones (e.g., zones from which hydrocarbons are being, or soon will be, produced) may be isolated from the non-producing zones (e.g., zones from which hydrocarbons or other fluids are not presently intended to be produced) of the subterranean formation. Additionally, it may be desirable to define certain production zones (e.g., more productive zones and/or zones containing a particular fluid to be produced) and isolate them from one another. For example, certain hydrocarbon production zones may produce more sand, water, gas, or wax than other areas. As a result, such sand-, water-, gas-, or wax-producing zones may require maintenance to an extent that may be unnecessary in other zones. As used herein, the terms "isolating a zone" and "zonal isolation" refer to the impairment or prevention of fluid communication between (1) a zone in a subterranean formation and a cased or open well bore penetrating that zone, or (2) at least one zone and another zone in a subterranean formation.

In certain instances, it may be desirable to re-establish fluid communication between zones in a subterranean formation that previously were isolated from each other. For example, during the drilling of a well bore in a subterranean formation, a weakly-consolidated zone (sometimes referred to as a "thief zone") may be encountered. A thief zone presents a variety of challenges that may increase the difficulty of safely controlling a well. Encountering a thief zone while drilling presents a risk that a portion of the drilling fluid being used to drill the well bore may be lost into the thief zone. Accordingly, it may be beneficial to plug off or isolate the thief zone, at least temporarily, and, after drilling operations have been completed, re-open the zone at a later time (in circumstances wherein the thief zone is located within a larger zone from which hydrocarbons ultimately may be produced).

Conventional attempts to solve this problem have involved, inter alia, the use of plugs that subsequently may be removed from the subterranean formation have been used to accomplish zonal isolation. However, removal of the plug may require additional trips into the well bore, adding cost to the drilling operation. Retrieving the plug by pulling it back up through the well bore may be problematic since there may not be sufficient space within the well bore through which to pull the plug without damaging upper portions of the well bore and/or casing strings set therein.

Another conventional approach to solving this problem includes the use of an acid-soluble plug comprising cement, a salt (e.g., calcium carbonate), and other materials, which, once used, can be dissolved by the introduction of an acidic solution into the well bore. However, this approach may have significant drawbacks, including, inter alia, environmental and occupational safety risks that may result from the use of the large quantities of the acidic solution, the risk that some of the acidic solution may escape into other portions of the subterranean formation, and the delay of waiting for the acidic solution to dissolve the plug. Other conventional approaches involve drilling through the plug, but this may require the use of other drilling equipment (e.g., drilling strings capable of producing a greater force, a stabilizer assembly to keep the drill string from being deflected by the plug) that may further complicate the drilling operation and/or risk damage to the well bore.

SUMMARY

The present invention relates to subterranean well construction. More particularly, the present invention relates to methods of isolating particular zones within a subterranean formation utilizing self-degrading cement compositions.

An example of a method of the present invention is a method comprising: providing a self-degrading cement composition that comprises a degradable material, an acid source, a base source, and a water source; placing the self-degrading cement composition in a zone within a subterranean formation; and allowing the self-degrading cement composition to set to form a solid mass that is capable of isolating the zone from a well bore penetrating the zone or from another zone.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
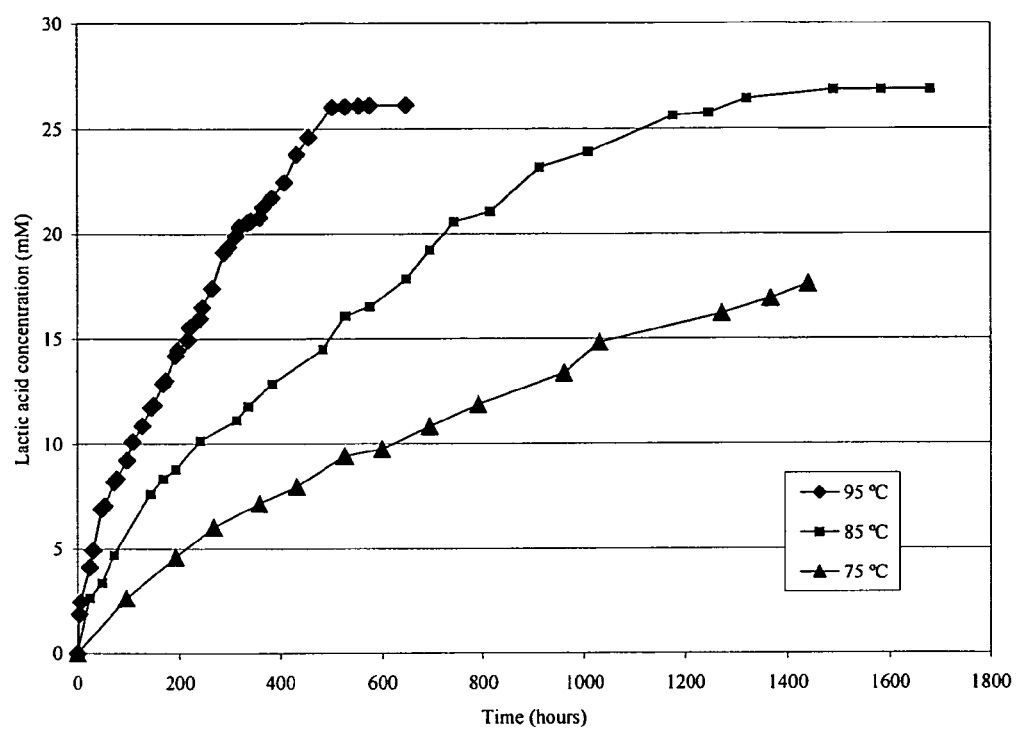
FIG. 1 illustrates the relationship of the time- and temperature-dependence of the degradation of a degradable material in one embodiment of the present invention.

The present invention relates to subterranean well construction. More particularly, the present invention relates to methods of isolating particular zones within a subterranean formation utilizing self-degrading cement compositions.

1. Self-Degrading Cement Compositions

The self-degrading cement compositions utilized in the methods of the present invention generally comprise a degradable material, an acid source, a base source, and a water source. In certain embodiments of the present invention, the self-degrading cement composition may provide sufficient structural integrity to isolate a zone within a subterranean formation for an indefinite period of time, after which, the degradation of the degradable material may create voids within the hardened mass of the self-degrading cement composition that may permit fluid communication through the region of the well bore in which it is placed. In certain embodiments of the present invention, the self-degrading cement composition may comprise a sufficient amount of degradable material that the degradation of the degradable material causes the hardened mass of the self-degrading cement composition to completely degrade.

A broad variety of acid sources and base sources may be suitable for use in the self-degrading cement compositions utilized in the methods of the present invention. Examples of suitable acid sources include, inter alia, magnesium chloride ($MgCl_2$), potassium phosphate monobasic ($KH_2PO_4$), sodium phosphate monobasic ($NaH_2PO_4$), phosphoric acid ($H_3PO_4$), magnesium sulfate ($MgSO_4$), and ammonium phosphate monobasic ($NH_6PO_4$). Examples of suitable base sources include, inter alia, magnesium oxide (MgO), and ammonia ($NH_3$). An example of a suitable source of magnesium oxide is commercially available from Martin Marietta under the trade name "MagChem 10." An example of a suitable source of potassium phosphate monobasic is commercially available from Fisher Scientific.

Generally, an acid source and base source may be chosen that may react so as to form an acid-base cement. For example, magnesium oxide may be chosen as a base source, and potassium phosphate monobasic may be chosen as an acid source, so that in the presence of water they may react to produce an acid-base cement having the chemical formula $MgKPO_4.6H_2O$. As another example, magnesium oxide may be chosen as a base source, and magnesium chloride may be chosen as an acid source, so that in the presence of water they may react to produce an acid-base cement having three oxychloride phases; one oxychloride phase may have the chemical formula $5\ Mg(OH_2)MgCl_2.8H_2O$, which may be referred to as "5-form." As another example, magnesium oxide may be chosen as a base source, and phosphoric acid may be chosen as an acid source, so that in the presence of water they may react to produce an acid-base cement having the chemical formula $MgHPO_4.3H_2O$. As still another example, magnesium oxide may be chosen as a base source, and magnesium sulfate may be chosen as an acid source, so that in the presence of water they may react to produce an acid-base cement having four possible oxysulfate phases; one oxysulfate phase may have the chemical formula $3\ Mg(OH)_2MgSO_4.8H_2O$, which may be referred to as "3-form." As still another example, magnesium oxide may be chosen as a base source, and ammonium phosphate monobasic may be chosen as an acid source, so that in the presence of water they may react to produce an acid-base cement having the chemical formula $Mg(NH_4)PO_4.6H_2O$. A broad variety of acid sources and base sources may be used, and a broad variety of acid-base cements may be produced, in accordance with the present invention, including, but not limited to, those acid sources, base sources, and acid-base cements that are disclosed in "Acid-Base Cements: Their Biomedical and Industrial Applications," by Alan D. Wilson and John W. Nicholson (Cambridge Univ. Press, 1993).

Generally, the acid source and base source may be present in the self-degrading cement composition in a stoichiometric amount. For example, in certain embodiments of the present invention wherein magnesium oxide is used as a base source and potassium phosphate monobasic is used as an acid source, their relative concentrations may be illustrated by Equation 1 below:

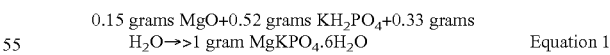

0.15 grams MgO+0.52 grams $KH_2PO_4$+0.33 grams $H_2O \rightarrow$ >1 gram $MgKPO_4.6H_2O$     Equation 1

Equation 1 is exemplary only, and may be modified as one of ordinary skill in the art will recognize, with the benefit of this disclosure. For example, additional quantities of magnesium oxide may be included, in amounts in the range of from about 1% excess by weight to about 25% excess by weight.

The self-degrading cement compositions utilized in the methods of the present invention generally comprise a water source. The water source may comprise fresh water, salt water (e.g., water containing one or more salts dissolved therein), brine (e.g., saturated salt water), or seawater. Generally, any water source may be used, provided that it does not contain an excess of compounds that may adversely affect other components in the self-degrading cement composition.

A broad variety of materials may be suitable as the degradable materials in the self-degrading cement compositions utilized in the methods of the present invention. In certain embodiments of the present invention, the degradable material may be a degradable polymer. The terms "degradation" or "degradable" refer to both the two relatively extreme cases of hydrolytic degradation that the degradable material may undergo, e.g., heterogeneous (or bulk erosion) and homogeneous (or surface erosion), and any stage of degradation in between these two. This degradation can be a result of, inter alia, a chemical or thermal reaction, or a reaction induced by radiation. The terms "polymer" or "polymers" as used herein do not imply any particular degree of polymerization; for instance, oligomers are encompassed within this definition.

A polymer is considered to be "degradable" herein if it is capable of undergoing an irreversible degradation when used in subterranean applications, e.g., in a well bore. The term "irreversible" as used herein means that the degradable material should degrade in situ (e.g., within a well bore) but should not recrystallize or reconsolidate in situ after degradation (e.g., in a well bore).

The degradability of a degradable polymer often depends, at least in part, on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

Suitable examples of degradable polymers that may be used in accordance with the present invention include, but are not limited to, those described in the publication of Advances in Polymer Science, Vol. 157 entitled "Degradable Aliphatic Polyesters," edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of suitable degradable polymers that may be used in conjunction with the methods of this invention include, but are not limited to, aliphatic polyesters; poly(lactides); poly(glycolides); poly(ε-caprolactones); poly(hydroxy ester ethers); poly(hydroxybutyrates); poly(anhydrides); polycarbonates; poly(orthoesters); poly(amino acids); poly(ethylene oxides); poly(phosphazenes); poly ether esters, polyester amides, polyamides, and copolymers or blends of any of these degradable polymers, and derivatives of these degradable polymers. The term "copolymer" as used herein is not limited to the combination of two polymers, but includes any combination of polymers, e.g., terpolymers and the like. As referred to herein, the term "derivative" is defined herein to include any compound that is made from one of the listed compounds, for example, by replacing one atom in the base compound with another atom or group of atoms. Of these suitable polymers, aliphatic polyesters such as poly(lactic acid), poly(anhydrides), poly(orthoesters), and poly(lactide)-co-poly(glycolide) copolymers are preferred. Poly(lactic acid) is especially preferred. Poly(orthoesters) also may be preferred. Other degradable polymers that are subject to hydrolytic degradation also may be suitable. One's choice may depend on the particular application and the conditions involved. Other guidelines to consider include the degradation products that result, the time for required for the requisite degree of degradation, and the desired result of the degradation (e.g., voids).

Aliphatic polyesters degrade chemically, inter alia, by hydrolytic cleavage. Hydrolysis can be catalyzed by either acids or bases. Generally, during the hydrolysis, carboxylic end groups may be formed during chain scission, which may enhance the rate of further hydrolysis. This mechanism is known in the art as "autocatalysis" and is thought to make polyester matrices more bulk-eroding.

Suitable aliphatic polyesters have the general formula of repeating units shown below:

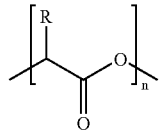

Formula I where n is an integer between 75 and 10,000 and R is selected from the group consisting of hydrogen, alkyl, aryl, alkylaryl, acetyl, heteroatoms, and mixtures thereof. In certain embodiments of the present invention wherein an aliphatic polyester is used, the aliphatic polyester may be poly(lactide). Poly(lactide) is synthesized either from lactic acid by a condensation reaction or, more commonly, by ring-opening polymerization of cyclic lactide monomer. Since both lactic acid and lactide can achieve the same repeating unit, the general term poly(lactic acid) as used herein refers to writ of formula I without any limitation as to how the polymer was made (e.g., from lactides, lactic acid, or oligomers), and without reference to the degree of polymerization or level of plasticization.

The lactide monomer exists generally in three different forms: two stereoisomers (L- and D-lactide) and racemic D,L-lactide (meso-lactide). The oligomers of lactic acid and the oligomers of lactide are defined by the formula:

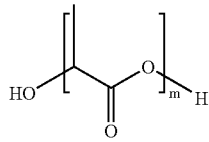

Formula II where m is an integer in the range of from greater than or equal to about 2 to less than or equal to about 75. In certain embodiments, m may be an integer in the range of from greater than or equal to about 2 to less than or equal to about 10. These limits may correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention in which a slower degradation of the degradable material is desired. Poly(D,L-lactide) may be a more amorphous polymer with a resultant faster hydrolysis rate. This may be suitable for other applications in which a more rapid degradation may be appropriate. The stereoisomers of lactic acid may be used individually, or may be combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters. In embodiments wherein polylactide is used as the degradable material, certain preferred embodiments employ a mixture of the D and L stereoisomers, designed so as to provide a desired degradation time and/or rate. Examples of suitable sources of degradable material are poly(lactic acids) that are commercially available from Cargill Dow under the trade names "6250D" and "5639A."

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosures of which are incorporated herein by reference.

Polyanhydrides are another type of degradable polymer that may be suitable for use in the present invention. Polyanhydride hydrolysis proceeds, inter alia, via free carboxylic acid chain-ends to yield carboxylic acids as final degradation products. Their erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers may depend on several factors including, but not limited to, the composition of the repeat units, flexibility of the chain, presence of polar groups, molecular mass, degree of branching, crystallinity, and orientation. For example, short-chain branches may reduce the degree of crystallinity of polymers while long chain branches may lower the melt viscosity and may impart, inter alia, extensional viscosity with tension-stiffening behavior. The properties of the material utilized further may be tailored by blending, and copolymerizing it with another polymer, or by a change in the macromolecular architecture (e.g., hyper-branched polymers, star-shaped, or dendrimers, and the like). The properties of any such suitable degradable polymers (e.g., hydrophobicity, hydrophilicity, rate of degradation, and the like) can be tailored by introducing select functional groups along the polymer chains. For example, poly(phenyllactide) will degrade at about one-fifth of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

Whichever degradable material is used in the present invention, the degradable material may have any shape, including, but not limited to, particles having the physical shape of platelets, shavings, flakes, ribbons, rods, strips, spheroids, toroids, pellets, tablets, or any other physical shape. In certain embodiments of the present invention, the degradable material used may comprise a mixture of fibers and spherical particles. One of ordinary skill in the art, with the benefit of this disclosure, will recognize the specific degradable material that may be used in accordance with the present invention, and the preferred size and shape for a given application.

In certain embodiments of the present invention, the degradable material used may comprise a self-degrading fiber that comprises an outer shell and a core liquid, wherein the outer shell comprises a degradable polymer and substantially retains the core liquid. In certain embodiments of the present invention, the outer shell may comprise a degradable polymer that is subject to hydrolytic degradation. The core liquid may comprise a liquid that is able to at least partially facilitate or catalyze the hydrolysis of the degradable polymer in the outer shell. Optionally, the self-degrading fiber may comprise a coating on the outer shell and/or a suitable additive within the core liquid, e.g., an additive chosen to interact with the degradable polymer, its degradation products, or the surrounding subterranean environment. In certain embodiments, the outer shell may be non-porous. Methods of making the self-degrading fibers described herein include any suitable method for forming hollow fibers. One such method involves extruding hollow fibers made from a desired degradable polymer, soaking the hollow fibers in a liquid that will be the core liquid, saturating the hollow fibers with the liquid, and drying the exterior of the outer core of the fibers in such a manner that the liquid is retained in the hollow fibers and becomes a core liquid. Another method involves extruding a spinning solution of a chosen degradable polymer from an annular slit of a double pipe orifice to form a sheath solution while simultaneously extruding a liquid through the inside pipe of the double pipe orifice, to form a core liquid within the hollow fibers. Another method involves using capillary action to place the core liquid in an already-formed suitable hollow fiber. Other suitable methods known in the art may be used as well.

In choosing the appropriate degradable material, one should consider the degradation products that will result, and choose a degradable material that will not yield degradation products that would adversely affect other operations or components utilized in that particular application. The choice of degradable material also may depend, at least in part, on the conditions of the well (e.g., well bore temperature). For instance, lactides have been found to be suitable for lower temperature wells, including those within the range of 60° F. to 150° F., and polylactides have been found to be suitable for well bore temperatures above this range.

In certain embodiments, the degradation of the degradable material could result in a final degradation product having the potential to affect the pH of the self-degrading cement compositions utilized in the methods of the present invention. For example, in certain embodiments wherein the degradable material is poly(lactic acid), the degradation of the poly(lactic acid) to produce lactic acid may alter the pH of the self-degrading cement composition. In certain embodiments, a buffer compound may be included within the self-degrading cement compositions utilized in the methods of the present invention in an amount sufficient to neutralize the final degradation product. Examples of suitable buffer compounds include, but are not limited to, calcium carbonate, magnesium oxide, ammonium acetate, and the like. One of ordinary skill in the art, with the benefit of this disclosure, will be able to identify the proper type and concentration of a buffer compound to include in the self-degrading cement composition for a particular application. An example of a suitable buffer compound comprises ammonium acetate and is commercially available from Halliburton Energy Services, Inc., under the trade name "BA-20."

Figure 2:
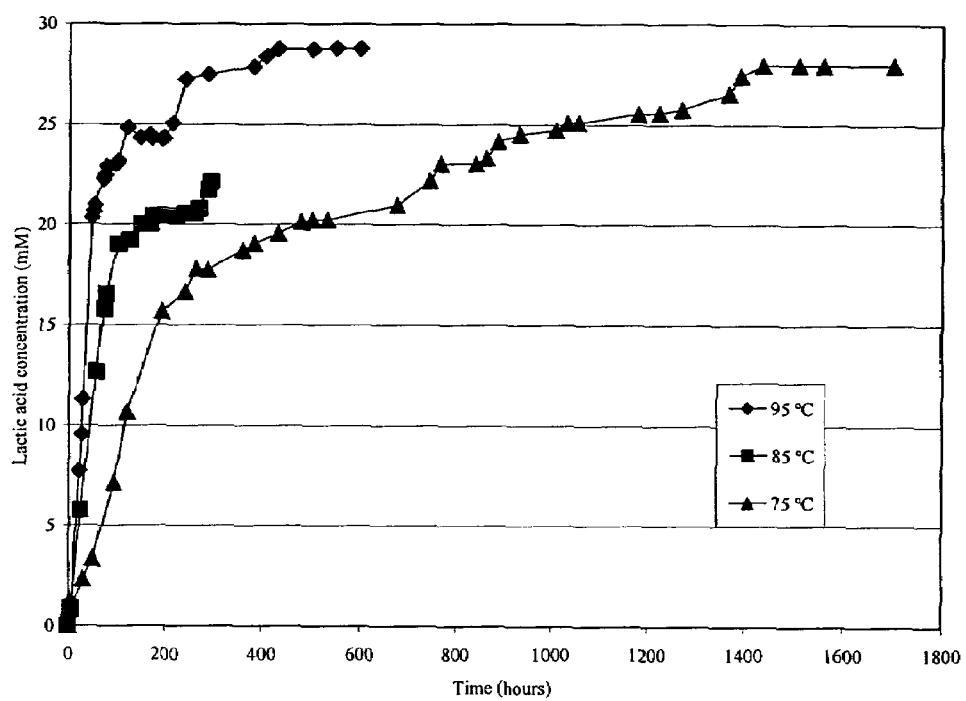
FIG. 2 illustrates the relationship of the time- and temperature-dependence of the degradation of a degradable material in another embodiment of the present invention.

The degradable materials utilized in the methods of the present invention may degrade over time at a rate that depends upon, among other things, the well bore temperature. Referring now to FIGS. 1 and 2, illustrated therein are graphical relationships of the time- and temperature-dependence of the degradation of certain degradable materials. The experiment in which these data were obtained was conducted as follows. A synthetic sea water solution was prepared by adding 41.953 grams of sea salt to one liter of deionized water. Next, 1.33 grams of sodium p-toluene sulfonate was added to the sea water solution to form a solution that was 6.919 mM in sodium p-toluene sulfonate. Next, one gram of a degradable material (6250D or 5639A) was placed in a one liter round-bottom flask containing 500 mL of synthetic sea water solution. A reflux condenser then was placed on each flask, and the contents were heated to 75, 85 or 95° C.

Using a disposable pipette, an aliquot was removed from each flask and placed in a 10 mL beaker. A carefully measured aliquot of 5.00 mL was removed and placed in a 50 mL round-bottom flask. The contents of the flasks were frozen by placing the flasks in liquid nitrogen. The flasks then were placed on a high vacuum line and the samples were allowed to dry overnight. After 24 hours, 1 mL of $D_2O$ was added to each flask, and the contents of the flask were stirred until the residue re-dissolved. The freeze drying was repeated to remove $D_2O$ and residual water. The remaining materials were dissolved in $D_2O$ for NMR measurement.

The $^1H$ NMR spectrum was collected using a Bruker 300 Avance NMR spectrometer operating at 300 MHz, using a 5 mm QNP probe at various time intervals. The integrated area of the methyl proton peak of lactic acid was compared to the integrated area of the 6.919 mM sodium p-toluene sulfonate internal standard, and the lactic acid concentration for each point displayed in FIGS. 1 and 2 was calculated from that ratio. FIG. 1 illustrates the time- and temperature-dependence of the generation of lactic acid caused by the degradation of 6250D, while FIG. 2 illustrates the time- and temperature-dependence of the generation of lactic acid caused by the degradation of 5639A.

For certain embodiments of the self-degrading cement compositions utilized in the methods of the present invention wherein poly(lactic acid) is used as the degradable material, Table 1 below demonstrates the relationship that may exist between the concentration of poly(lactic acid) in the self-degrading cement composition and the degree of void space that may result in the solid mass after the poly(lactic acid) is allowed to degrade.

TABLE 1

| Poly(lactic acid) concentration (volume percent of the cement composition) | Resulting void space |
|---|---|
| 8% | 20% |
| 11% | 30% |
| 13% | 40% |
| 15% | 50% |

Optionally, the self-degrading cement compositions utilized in the methods of the present invention may include a set retarder. Generally, any set retarder may be used with the self-degrading cement compositions utilized in the methods of the present invention. Examples of set retarders suitable for use in the self-degrading cement compositions utilized in the methods of the present invention include, but are not limited to, sodium citrate and sodium borate. An example of a suitable commercially-available set retarder is Component R, available from Halliburton Energy Services, Inc., of Duncan, Okla. Where included, the set retarder may be present in the self-degrading cement compositions utilized in the methods of the present invention in an amount in the range of from about 0.05% to about 10% by weight of the self-degrading cement composition. In certain preferred embodiments, the set retarder may be present in the self-degrading cement compositions utilized in the methods of the present invention in an amount in the range of from about 0.1% to about 4% by weight of the self-degrading cement composition.

The self-degrading cement compositions utilized in the methods of the present invention optionally may include a strength-enhancing additive, which may act, among other things, to increase the stability of the set cement. Examples of these strength-enhancing additives include, but are not limited to, Newberyite, Struvite, and calcium carbonate. Where included, the optional strength-enhancing additive may be present in the self-degrading cement compositions utilized in the methods of the present invention in an amount in the range of from about 5% to about 60% by weight of the self-degrading cement composition. In certain embodiments, the optional strength-enhancing additive may be present in the self-degrading cement compositions utilized in the methods of the present invention in an amount in the range of from about 10% to about 30% by weight of the self-degrading cement composition.

The self-degrading cement compositions utilized in the methods of the present invention optionally may include a lost circulation additive, which may act, inter alia, to prevent or reduce loss of the self-degrading cement composition into the subterranean formation. Examples of lost circulation additives suitable for use in the methods of the present invention include, but are not limited to, hydrophilic fibers, vitrified shale (such as PRESSUR-SEAL, commercially available from Halliburton Energy Services, Inc., of Duncan, Okla.), gilsonite, cellophane flakes (such as FLOCELE, commercially available from Halliburton Energy Services, Inc.), thermoset laminate particulates (such as PHENO SEAL, commercially available from Halliburton Energy Services, Inc.), graphitic particulates (such as STEEL SEAL, commercially available from Halliburton Energy Services, Inc.), and the like. The lost circulation additive may comprise an acid-degradable material (e.g., acid-degradable fibers or particulates), which may be degraded by an acid generated in the degradation of the acid-base cement. An example of a suitable acid-degradable lost circulation additive is calcium carbonate, commercially available from Halliburton Energy Services, Inc., under the trade name BARACARB. Where included, the optional lost circulation additive may be present in the self-degrading cement compositions utilized in the methods of the present invention in an amount in the range of from about 5 pounds per barrel to about 150 pounds per barrel of the self-degrading cement composition. In certain embodiments, the optional lost circulation additive may be present in the self-degrading cement compositions utilized in the methods of the present invention in an amount in the range of from about 5 pounds per barrel to about 30 pounds per barrel of the self-degrading cement composition.

Examples of other additional additives that may be added to the self-degrading cement compositions utilized in the methods of the present invention include, among other things, salts, fly ash, fumed silica, bentonite, viscosifiers, fluid loss control additives (e.g., additives that may act, inter alia, to prevent loss of filtrate (e.g., base fluids in the self-degrading cement composition, such as water) into the subterranean formation), suspending agents, dispersants, and the like. An example of a suitable fly ash is "POZMIX®A," commercially available from Halliburton Energy Services, Inc., of Duncan, Okla. An example of a suitable source of fumed silica is "SILICALITE™," commercially available from Halliburton Energy Services, Inc., of Duncan, Okla. An example of a suitable viscosifier is "VERSASET™," commercially available from Halliburton Energy Services, Inc., of Duncan, Okla. One skilled in the art, with the benefit of this disclosure, will be able to determine which additional additives are appropriate for a particular application of the methods of the present invention, as well as the amounts of those additives that should be used.

2. Methods of Isolating Zones in a Subterranean Formation

The present invention provides methods of isolating a zone in a subterranean formation. Generally, the methods of the present invention involve flowing a self-degrading cement composition into a region of a subterranean formation via a well bore, so as to place the self-degrading cement composition adjacent or within a target zone in the formation that is desired to be isolated. The self-degrading cement composition then is permitted to solidify (temporarily, or permanently) within the target zone. The well bore into which the self-degrading cement composition may be flowed may be an open hole, a cased hole, or any combination thereof.

Figure 3:
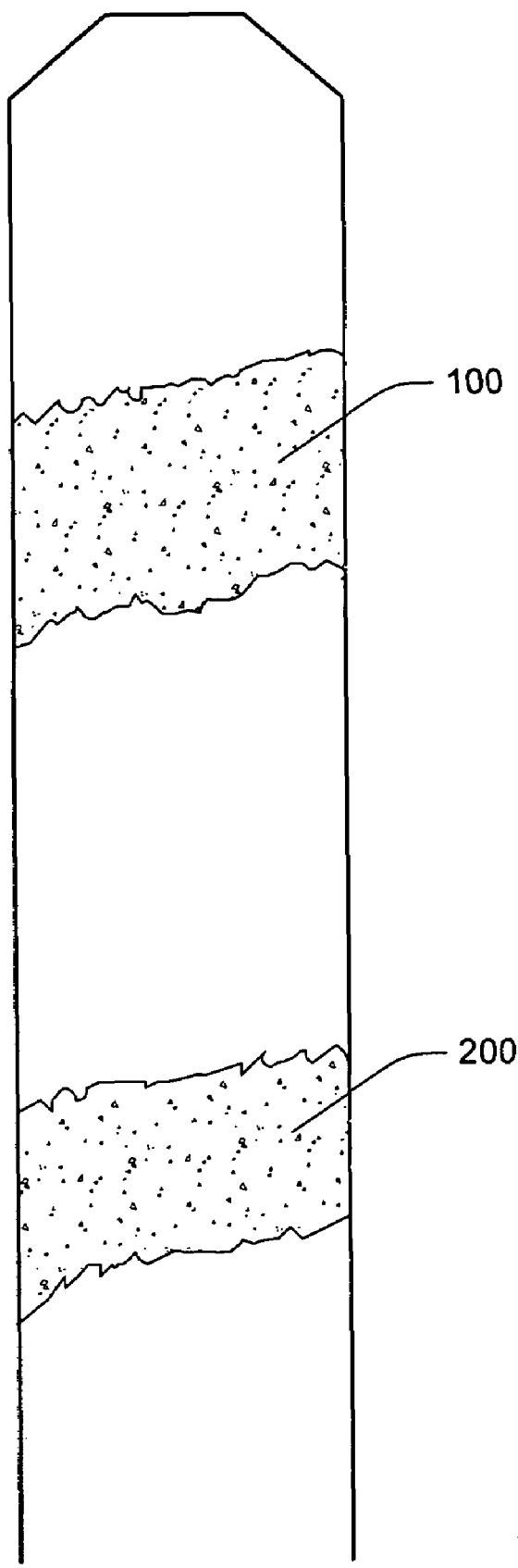
FIG. 3 illustrates a cross section of a subterranean formation, within which reside two hydrocarbon-bearing zones.

Referring now to FIG. 3, illustrated therein is a cross-section of a subterranean formation. Hydrocarbon-bearing zones 100 and 200 are shown. Hydrocarbon-bearing zone 100 is a weakly consolidated zone.

Figure 4:
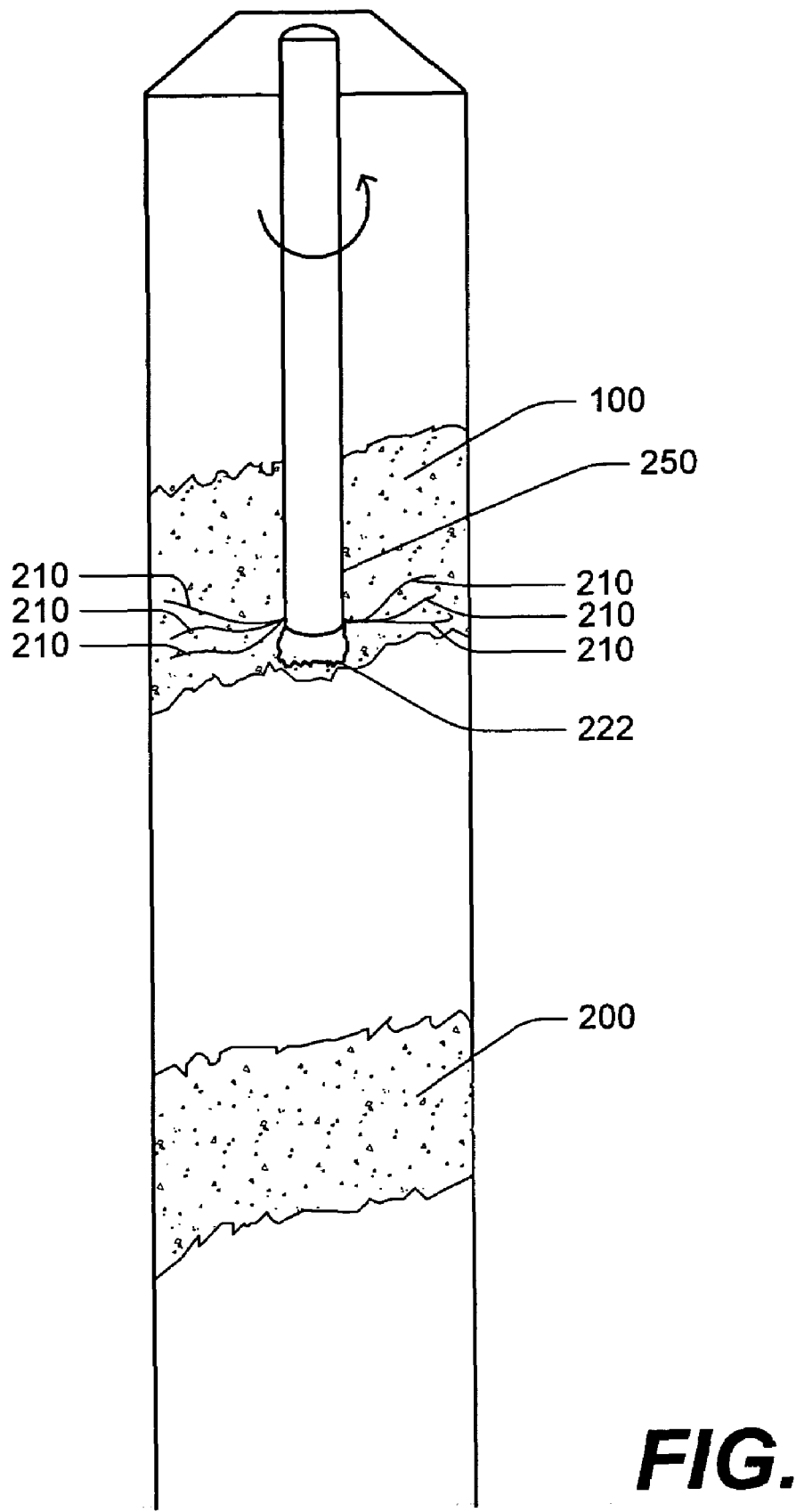
FIG. 4 illustrates the cross section of FIG. 3, and further illustrates an exemplary drill string drilling a well bore therein.

Referring now to FIG. 4, drill string 250 comprising drill bit 222 is shown drilling a well bore into hydrocarbon-bearing zone 100. Because of the weakly consolidated nature of hydrocarbon-bearing zone 100, undesirably large quantities of drilling fluid 210 may be lost therein, as depicted in FIG. 4. The loss of large quantities of drilling fluid 210 into hydrocarbon-bearing zone 100 generally is undesirable, because it may result in the loss of the ability to control the well that is being drilled.

Figure 5:
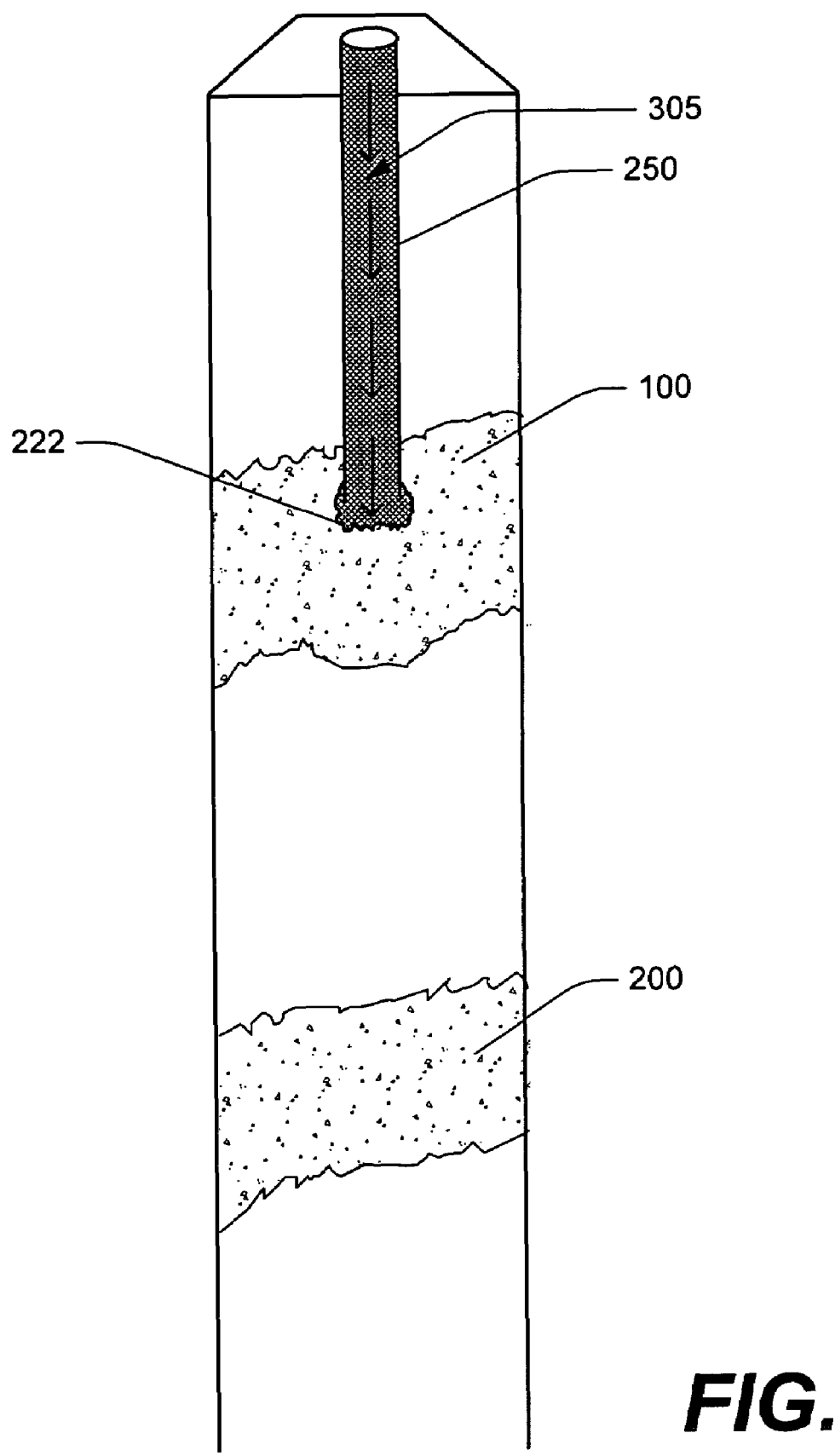
FIG. 5 illustrates the cross section of FIG. 4, and further illustrates the placement of a self-degrading cement composition in a portion of a hydrocarbon-bearing zone.

Referring now to FIG. 5, self-degrading cement composition 305 of the present invention is shown flowing through drill string 250. Self-degrading cement composition 305 may be flowed into the subterranean formation in the methods of the present invention in any suitable manner. In some embodiments, self-degrading cement composition 305 may be pumped through a drill string, such as drill string 250. In some embodiments, self-degrading cement composition 305 may be pumped through an open-ended coiled tubing to the desired location in the subterranean formation. In some embodiments of the present invention, self-degrading cement composition 305 may be pumped directly down the annular space between the well bore walls and the exterior of the pipe string; pumping directly down the annular space is commonly referred to in the art as "bull-heading." In some embodiments, self-degrading cement composition 305 may be pumped through perforations in a casing or liner that may be present in the well bore. One skilled in the art, with the benefit of this disclosure, will recognize the appropriate techniques and equipment for placing self-degrading cement composition 305 in a particular application.

After the placement of self-degrading cement composition 305 within the subterranean formation, the water source may combine with the dry materials in self-degrading cement composition 305 to form what may be referred to as a "hydrate," e.g., a solid compound comprising water molecules that may combine in a definite ratio. Furthermore, the water molecules within the hydrate may provide a hydrolysis source for the degradable material. The amount of time required for self-degrading cement composition 305 to set to form a solid mass capable of isolating a zone in a subterranean formation may depend upon a variety of factors, including, but not limited to, the temperature in the subterranean formation, the formulation of self-degrading cement composition 305, the hydraulic pressure within the different zones of the subterranean formation, and/or the presence of a set retarder. One of ordinary skill in the art, with the benefit of this disclosure, will recognize the amount of time required for self-degrading cement composition 305 to set in a particular application. In some embodiments of the present invention, permitting self-degrading cement composition 305 to set to form a solid mass capable of isolating a zone in the subterranean formation may require waiting an amount of time in the range of from about 15 minutes to about 72 hours.

Figure 6:
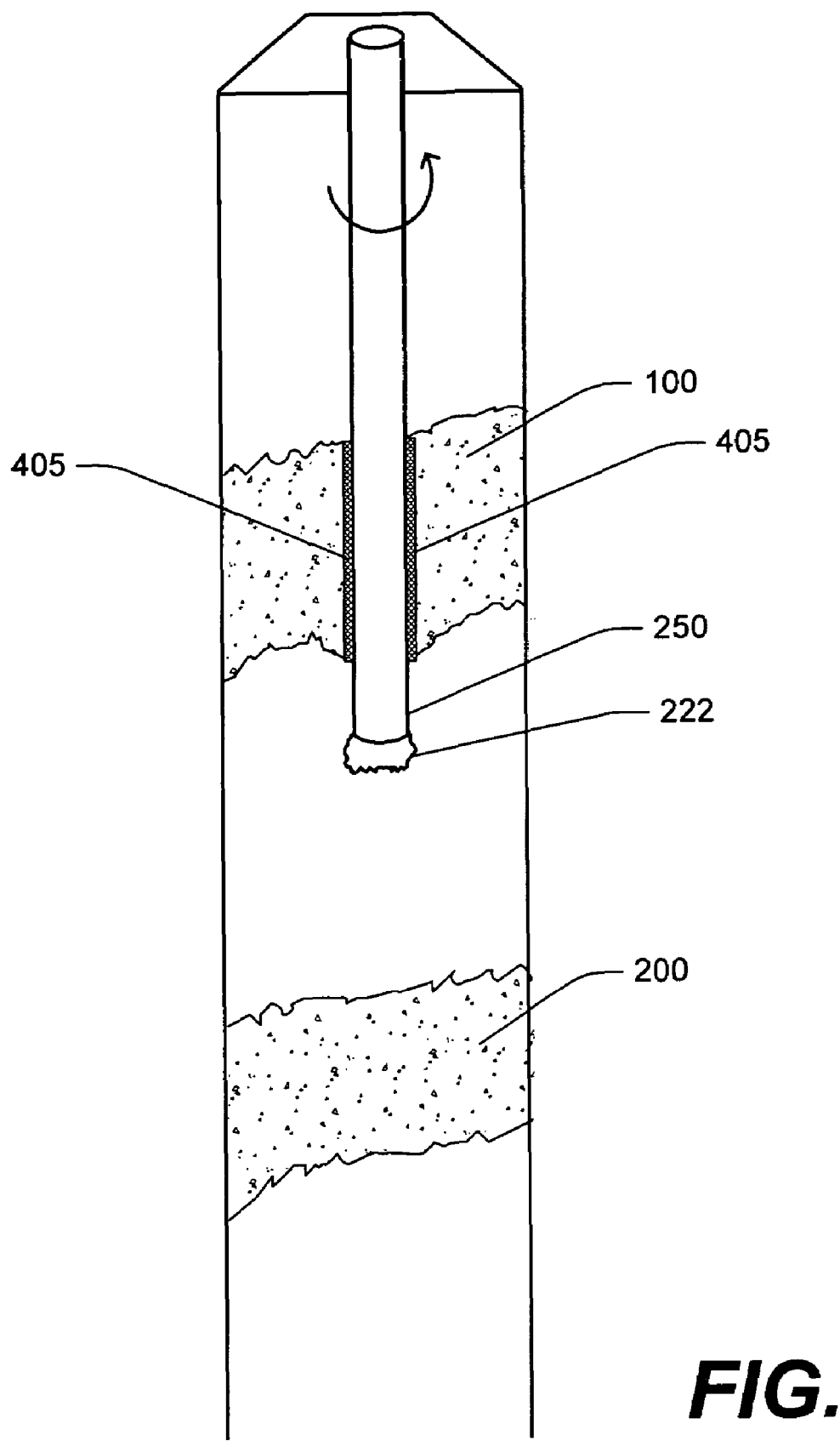
FIG. 6 illustrates the cross section of FIG. 5, and further illustrates the exemplary drill string continuing to drill a well bore therein, after the self-degrading cement composition has at least partially solidified.

Referring now to FIG. 6, self-degrading cement composition 305 (shown in FIG. 5) has solidified to form solid mass 405. Drill string 250 has drilled through solid mass 405 and continues drilling en route to hydrocarbon-bearing zone 200.

Figure 7:
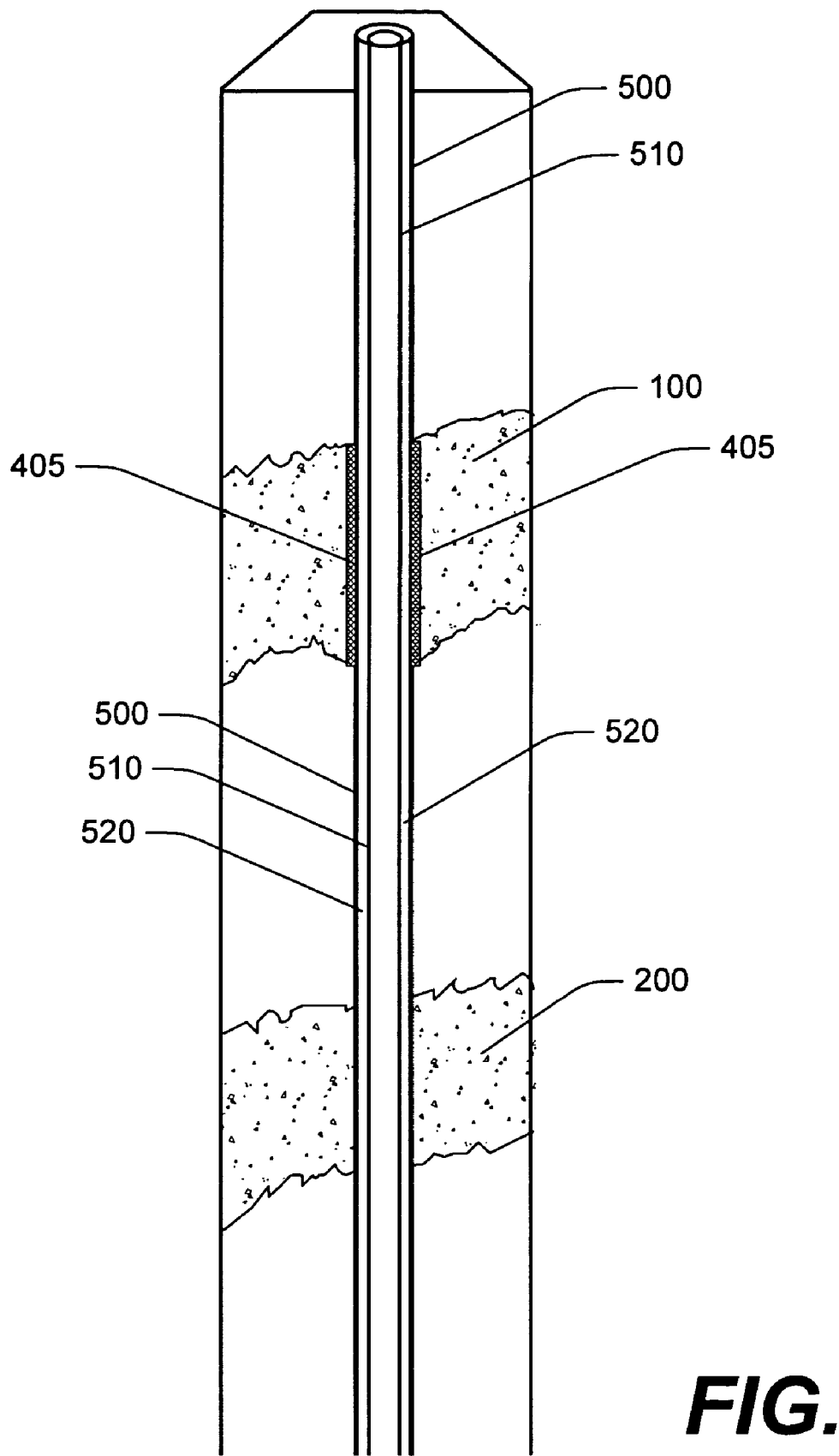
FIG. 7 illustrates the cross section of FIG. 6, and further illustrates the placement of an exemplary casing within the well bore drilled by the exemplary drill string.

Referring now to FIG. 7, well bore 500 has been drilled, and casing string 510 is shown disposed therein.

Figure 8:
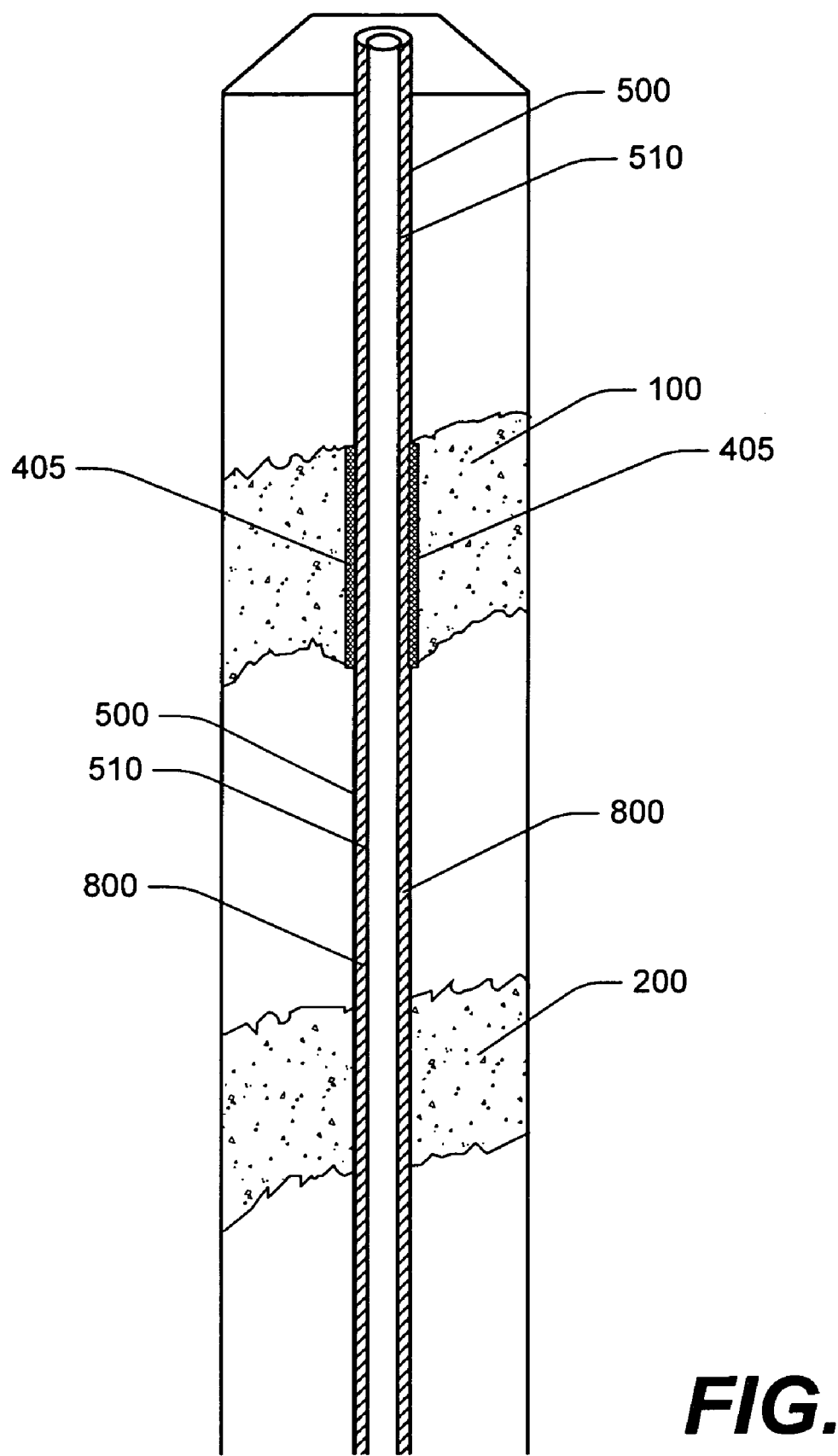
FIG. 8 illustrates the cross section of FIG. 7, and further illustrates a conventional cement composition having been placed in an exemplary annulus in the well bore.

Referring now to FIG. 8, a conventional cement composition 800 is shown having been placed in annulus 520 between the walls of well bore 500 and the outer diameter of casing string 510. Generally conventional cement composition 800 will be flowed into annulus 520 as a fluid, and then will be permitted to set to form a solid set cement sheath within annulus 520. Conventional cement composition 800 may be placed within annulus 520 in any manner desirable, including, but not limited to, via conventional circulation (e.g., flowing from the surface through the inner diameter of casing string 510 and then into position within annulus 520) and via reverse-circulation (e.g., flowing from the surface into position within annulus 520 without flowing into or through the inner diameter of casing string 510). Generally, conventional cement composition 800 may be any cement composition that will set to form a cement sheath having a desired tensile strength and life.

Figure 9:
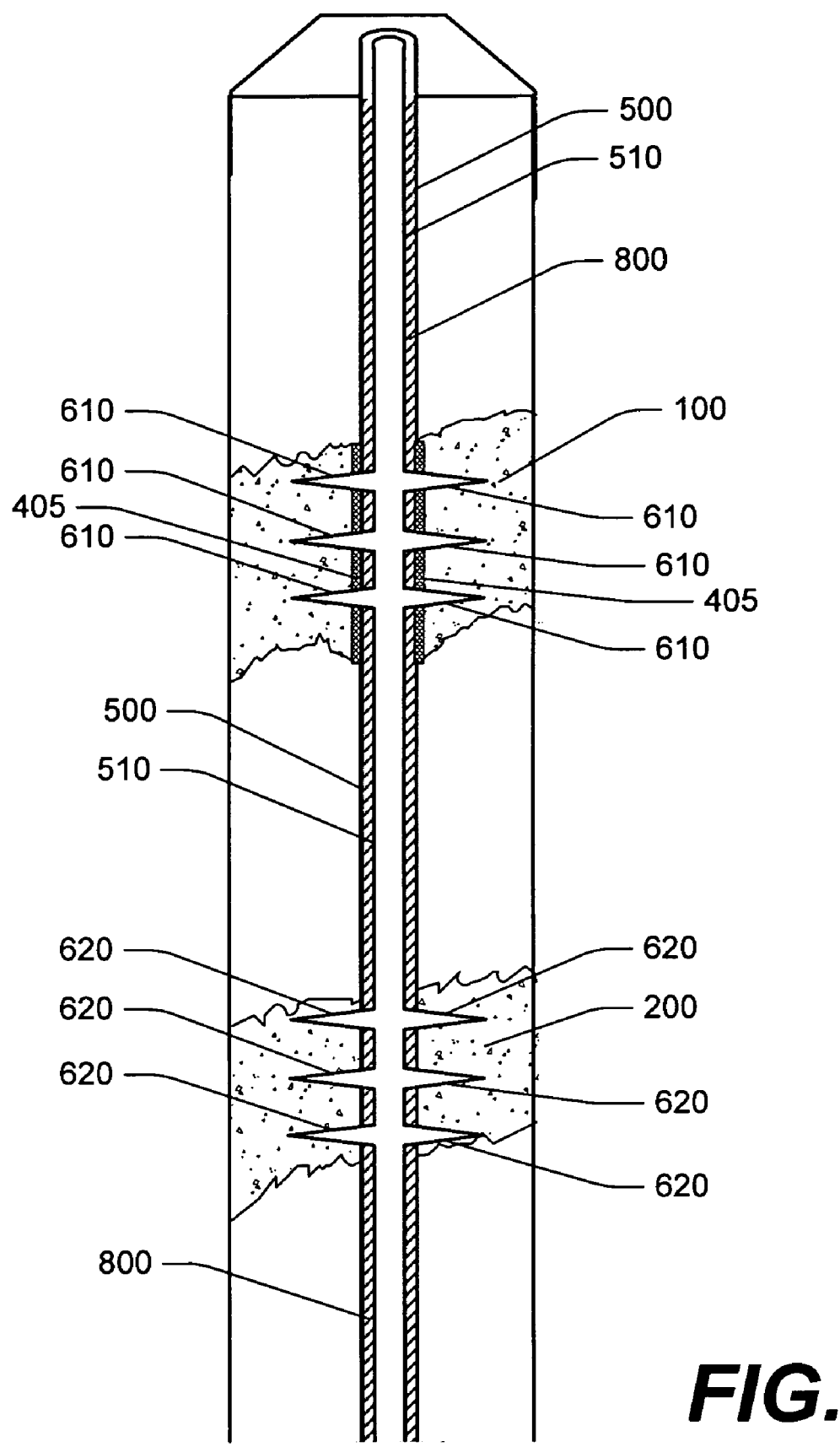
FIG. 9 illustrates the cross section of FIG. 8, and further illustrates the presence of exemplary perforations within the hydrocarbon-bearing zones.

Referring now to FIG. 9, perforations 610 have been made in hydrocarbon-bearing zone 100, and perforations 620 have been made in hydrocarbon-bearing zone 200.

Figure 10:
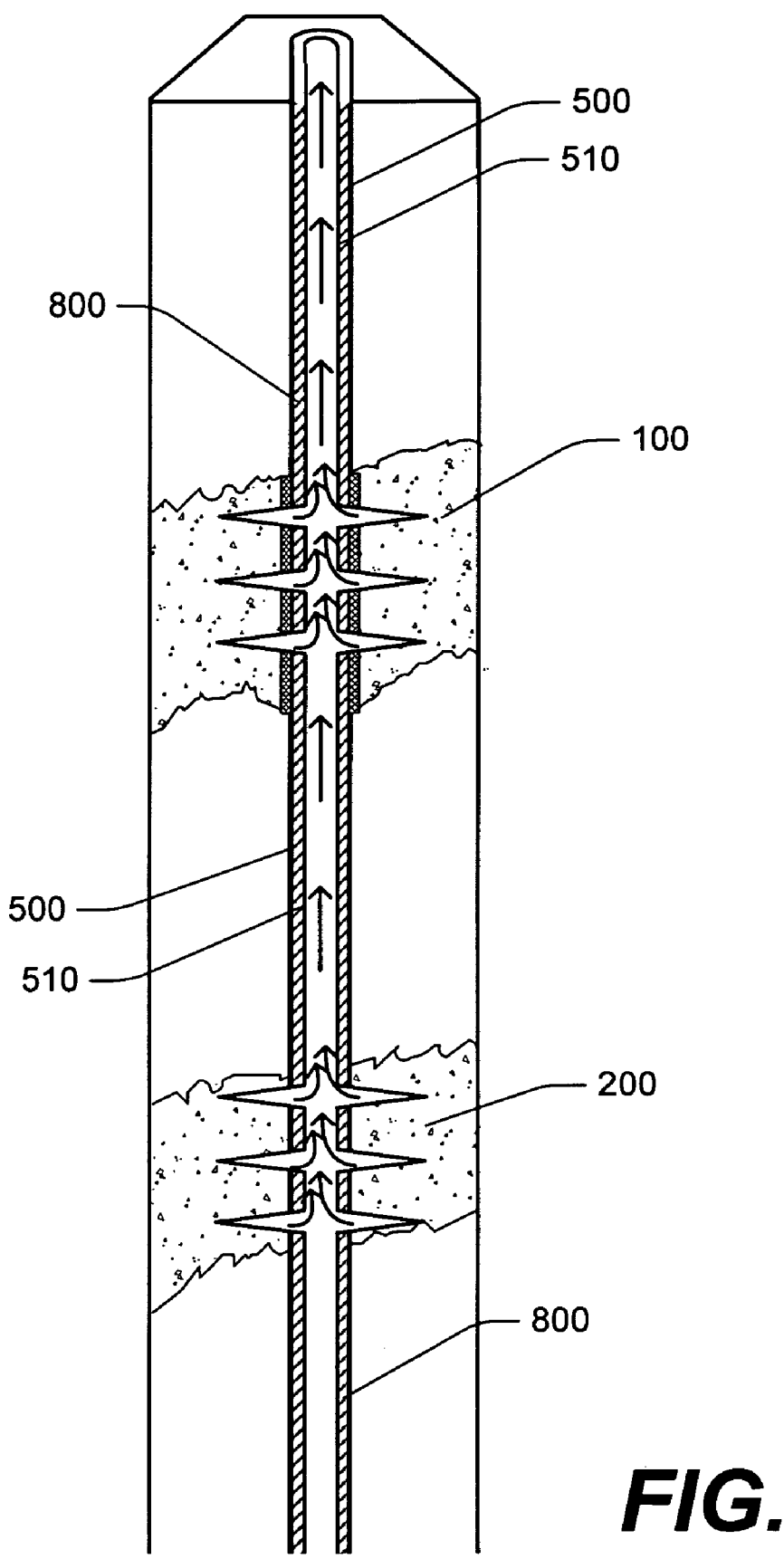
FIG. 10 illustrates the cross section of FIG. 9, and further illustrates the production of hydrocarbons through the exemplary perforations within the hydrocarbon-bearing zones.

In some embodiments of the present invention, solid mass 405 may be allowed to degrade such that fluid communication between an isolated zone (e.g., hydrocarbon-bearing zone 100) and other portions of the subterranean formation and/or well bore 500 is at least partially restored. In some embodiments of the present invention, it may be desirable to allow the degradable material to degrade slowly over time, rather than instantaneously. In certain embodiments, allowing solid mass 405 to degrade such that fluid communication between an isolated zone and other portions of the subterranean formation and/or well bore 500 is at least partially restored may require waiting an amount of time in the range of from about 4 hours to about 36 hours. Referring now to FIG. 10, solid mass 405 (shown in FIGS. 7 and 8) has completely degraded to permit hydrocarbons to be produced from hydrocarbon-bearing zone.

To facilitate a better understanding of the present invention, the following examples of certain aspects of some embodiments are given. In no way should the following examples be read to limit, or to define, the scope of the invention.

EXAMPLE 1

Sample compositions were formed as follows. First, 7.58 grams of magnesium oxide were dry blended with 25.75 grams of potassium phosphate monobasic crystals ($KH_2PO_4$), and mixed with 16.67 grams of tap water. The mixture was stirred for some time, and poly(lactic acid) ("6250D") was added, generally in an amount in the range of from about 35% by weight to about 40% by weight. Certain of the sample compositions further comprised an acid-base cement referred to as Newberyite, and having the chemical formula $MgH(PO_4).3H_2O$. Among other things, Newberyite is thought to impart strength-enhancing properties to the sample composition, and the additional water that Newberyite may supply may facilitate hydrolysis of the degradable material (6250D, in this example). Table 2 sets forth the respective amounts of 6250D and Newberyite included in a particular sample composition.

TABLE 2

| Sample Composition | Poly(lactic acid) ("6250D") | Newberyite |
|---|---|---|
| 1 | 20 grams | Not added |
| 2 | 20 grams | Not added |
| 3 | 20 grams | 10 grams |
| 4 | 15 grams | 10 grams |
| 5 | 15 grams | Not added |
| 6 | 20 grams | 10 grams |
| 7 | 20 grams | Not added |
| 8 | 20 grams | 10 grams |

Each sample composition was placed in a 20 mL plastic cylinder, and was allowed to set therein into a hard rod. Each rod then was left for a designated cure time at room temperature. Next, the set rod was taken out of the cylinder and either tested for compressibility or directly placed in a bomb supplied by PARR Instrument Company, Moline, Ill. Among other things, the bomb prevented the escape of water that may have been present in the set rod. The bomb was heated in a stove at 250° F. After a time (listed as "PARR Time" in Table 3 below), the bomb was removed from the stove, and its contents were observed to see whether or not degradation occurred.

Certain sample compositions were tested for compressibility using an apparatus supplied by Tinius Olsen Company of Willow Grove, Pa. The procedure was performed as follows. After the sample composition had cured and set into a hard rod, the rod was cut down to a 1 inch diameter and a 3 inch length. Two faces of the rod were smoothed. The rod then was placed under the Tinius Olsen compressibility load cell and subjected to a displacement load at a rate of 0.07 inches per minute. The maximum loading that each rod could withstand until failure was recorded.

The results of the testing are set forth in Table 3 below.

TABLE 3

| Sample Composition | Cure Time (75° F.) | Rod Compressive Strength (psi) | PARR Time (250° F.) | Degradation Comments |
|---|---|---|---|---|
| 1 | 24 hours | — | 24 hours | Flowable liquid with particulates about 1 mm in diameter. |
| 2 | 24 hours | 290 | 72 hours | Chunks (5-10 mm in diameter) with some liquid. |
| 3 | 24 hours | 1560 | 24 hours | Small chunks (1-3 mm with some liquid); very "sandy." |
| 4 | 24 days | 2040 | 24 hours | No self-degradation observed |
| 5 | 24 days | 510 | 48 hours | No self-degradation observed |
| 6 | 44 hours | 2470 (High) 490 (Low) | 72 hours | No self-degradation observed |
| 7 | 24 hours | 630 | 24 hours @ 180° F. | No self-degradation observed |
| | | | 24 hours @ 250° F. | Large chunks (>1 cm in diameter) with some liquid. |
| 8 | 24 hours | 1180 | 24 hours @ 180° F. | No self-degradation observed |
| | | | 24 hours @ 250° F. | Large chunks (>1 cm in diameter) with some liquid. |

Example 1 demonstrates, inter alia, that the combination of a degradable material and an acid-base cement may be suitable for use in the methods of the present invention.

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A method comprising:
   providing a self-degrading cement composition that comprises a degradable material, an acid source, a base source, and a water source;
   placing the self-degrading cement composition in a zone within a subterranean formation; and
   allowing the self-degrading cement composition to set to form a solid mass that is capable of isolating the zone from a well bore penetrating the zone or from another zone.

2. The method of claim 1 wherein the solid mass is capable of isolating the zone from a well bore penetrating the zone for at least about 8 hours after the self-degrading cement composition has set to form the solid mass.

3. The method of claim 1 wherein the zone is a first zone within the subterranean formation, and wherein the solid mass is capable of isolating the first zone from a second zone within the formation.

4. The method of claim 1 wherein the degradable material comprises at least one degradable material selected from the group consisting of: an aliphatic polyester; a polysaccharide; a poly(lactide); a poly(glycolide); a poly(ε-caprolactone); a protein; a poly(hydroxybutyrate); a poly(anhydride); an aliphatic polycarbonate; an ortho ester; a poly(orthoester); a poly(vinylacetate); a poly(hydroxy ester ether); a poly(amino acid); a poly(ethylene oxide); chitin; chitosan; a polyphosphazene; a poly ether ester; a polyester amide; a polyamide; and any derivative thereof.

5. The method of claim 1 wherein the degradable material comprises poly(lactic) acid.

6. The method of claim 1 wherein the degradable material comprises a self-degrading fiber that comprises an outer shell and a core liquid, wherein the outer shell comprises a degradable polymer and substantially retains the core liquid.

7. The method of claim 6 wherein the self-degrading fiber comprises a coating on the outer shell.

8. The method of claim 6 wherein the self-degrading fiber comprises an additional additive within the core liquid.

9. The method of claim 1 wherein the acid source comprises at least one acid source selected from the group consisting of: magnesium chloride; potassium phosphate monobasic; phosphoric acid; magnesium sulfate; ammonium phosphate monobasic; and any derivative thereof.

10. The method of claim 1 wherein the base source comprises at least one base source selected from the group consisting of: magnesium oxide; ammonia; and any derivative thereof.

11. The method of claim 1 wherein the self-degrading cement composition further comprises a lost circulation additive.

12. The method of claim 1 wherein the self-degrading cement composition further comprises a set retarder.

13. The method of claim 1 further comprising allowing the solid mass to degrade such that fluid communication between the isolated zone and the well bore is at least partially restored.

14. The method of claim 1 wherein the acid source comprises potassium phosphate monobasic and wherein the base source comprises magnesium oxide.

15. The method of claim 1 wherein the acid source comprises magnesium chloride and wherein the base source comprises magnesium oxide.

16. The method of claim 1 wherein the acid source comprises phosphoric acid and wherein the base source comprises magnesium oxide.

17. The method of claim 1 wherein the acid source comprises magnesium sulfate and wherein the base source comprises magnesium oxide.

18. The method of claim 1 wherein the acid source comprises ammonium phosphate monobasic and wherein the base source comprises magnesium oxide.

19. The method of claim 1 wherein the degradable material comprises ortho ester.

20. The method of claim 1 wherein the degradable material comprises poly(orthoester).

* * * * *